3,251,811
PROCESS FOR THE PREPARATION OF POLYSULFIDE POLYMERS
Paul F. Warner and James R. Slagle, Phillips, Tex., assignors to Phillips Petroleum Company, a corporation of Delaware
No Drawing. Filed Oct. 2, 1961, Ser. No. 141,994
8 Claims. (Cl. 260—79.7)

This invention relates to the production of polysulfide polymers. In accordance with one aspect, this invention relates to an improved process for the production of polysulfide polymers from mercaptans and sulfur.

Various processes are known for the production of polysulfide polymers. Some of these known processes employ catalysts while others are purely thermal. However, many of the known processes have various disadvantages for one reason or another. For example, some of these processes require high temperatures, others require expensive catalysts and still others require expensive and difficult to produce reactants, while still others require complicated recovery steps, which are expensive, to recover the polymer from the reaction effluent. Thus it can be safely stated that there is still considerable room for improvement in the production of these materials, especially with respect to the provision of a process wherein readily available reactants can be used and a simple recovery system provided for the production of valuable polysulfide polymers.

The present invention relates to an improved process for the production of polysulfide polymers by the oxidation of mercaptans with free sulfur in the presence of a basic catalyst.

Accordingly, an object of this invention is to provide an improved process for the production of polysulfide polymers.

Another object of this invention is to provide a process for the reaction of dimercaptans with sulfur to form polysulfide polymers having desirable properties.

Other objects, aspects as well as the several advantages of this invention will be apparent to those skilled in the art upon a further study of this specification and the appended claims.

According to the invention, we provide an improved process for the production of polysulfide polymers which comprises contacting an organic dimercaptan compound with free sulfur as an oxidizing agent in the presence of a basic catalyst at a temperature in the range 0 to 500° F. to form a polysulfide polymer, and then recovering said polymer as a product of the process.

The mercaptan reactants that can be employed according to the invention can be represented by the formula HS—R—SH wherein R is an organic radical containing up to and including 20 carbon atoms per molecule. The hydrocarbon dimercaptans and especially the cyclic hydrocarbon dimercaptans as exemplified by 2,9-p-menthane dithiol are preferred. In the above formula, R can be a hydrocarbon radical such as aliphatic, cycloaliphatic, aryl and the like or a heterocyclic structure such as:

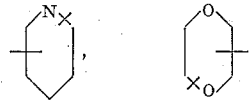

and

as well as other organic radicals.

Representative examples of suitable dimercaptan compounds that can be employed according to the invention include dimercaptoethane, dimercaptopropane, 1,5-dimercaptopentane, 1,6-dimercaptohexane, 1,8-dimercaptodecane, 2,3-dimercapto pentadecane, 1,6-dimercaptoeicosane, 1,4-dimercapto-2-butene, 1,8-dimercapto-2-octene, dimercaptoethyl ether, dimercaptopropyl ether, dimercapto dipropyl sulfide, dimercaptoxylene, dimercaptodiethoxy benzene, 1,3-dimercapto toluene, p-dimercaptobenzene, dimercaptocyclohexane, dimercaptomethylcyclohexane, 2,9-p-menthane dithiol, dimercapto-alpha-terpinene, dimercaptophellandrene, dimercaptosylvestrene, 2,5-dimercaptopyridine, dimercaptothiophene, dimercapto-p-dioxane and the like.

The oxidizing agent that can be employed according to the invention includes free or elemental sulfur and sulfur-donor or sulfur-yielding compounds. Suitable sulfur-donor or sulfur yielding compounds that can be used include thiuram polysulfides having the structural formula

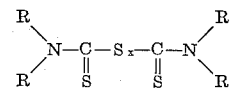

in which $x$ is 2, 3 or 4, R represents an alkyl or cycloalkyl group containing up to and including 10 carbon atoms, and the R's attached to a terminal nitrogen atom can be joined to form with said nitrogen atom a heterocyclic structure. Examples of such compounds are tetramethylthiuram disulfide, tetraethylthiuram trisulfide, tetraamylthiuram disulfide, tetradecylthiuram disulfide, tetraoctylthiuram disulfide, tetracyclohexylthiuram disulfide, dipentamethylenethiuram tetrasulfide, and the like.

Selenium dithiocarbamates of the formula

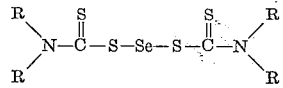

wherein the R groups represent alkyl or cycloalkyl radicals containing up to and including 10 carbon atoms, and the R's attached to a terminal nitrogen atom can be joined to form with said nitrogen a heterocyclic structure, can also be employed as the sulfur-yielding compounds. Examples of such compounds are selenium dimethyl dithiocarbamate, selenium diethyl dithiocarbamate, selenium didecyldithiocarbamate, selenium dioctyldithiocarbamate, selenium dinonyldithiocarbamate, selenium dicyclohexyl dithiocarbamate, selenium pentamethylenedithiocarbamate, and the like.

Other sulfur-donor compounds that can be used include N,N'-polythiodiamines of the formula

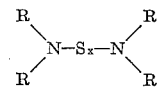

where $x$ is 2, 3 or 4, and R represents an alkyl or cycloalkyl group containing up to and including 10 carbon atoms, such radicals being purely hydrocarbon or substituted by cyano groups. The R groups can be joined to form heterocyclic structures which include the nitrogen atom, such heterocyclic structures being joined by juncture of alkyl groups or inclusive of oxygen, sulfur or nitrogen. Examples of such compounds are N,N'-dithiobis(diethylamine), N,N' - dithiobis(dibutylamine), N,N'-trithiobis(dihexylamine), N,N' - dithiobis(dioctylamine), N,N' - dithiobis(didecylamine), N,N' - dithiobis(morpholine), N,N'-dithiobis(thiamorpholine), N,N'-dithiobis(piperidine), N,N'-dithiobis(piperazine), N,N'-dithiobis-(n-butylaminoacetontrile), N,N'-dithiobis-(beta-ethylaminopropionitrile), N,N' - tetrathiobis(octyl - 6 - cyanooctylamine), N,N'-dithiobis(dicyclohexylamine), N,N'-dithiobis(decyl - 5 - cyanoamylamine), N,N'-trithiobis(hexyl-9- cyanononylamine), N,N' - dithiobis(n-butylaminopropionitrile), and the like.

Another class of compounds suitable for the purposes of the present invention are the thiazyl sulfides, including mercaptobenzothiazole, zinc 2-mercaptobenzothiazole, cupric 2-mercaptobenzothiazole, benzothiazyl, disulfide, and the like.

An additional class of compounds suitable for the purposes of the invention include the disulfides of the general formula R—$S_x$—R in which $x$ is 2, 3, or 4 and R is an alkyl or cycloalkyl group containing from 1 to 16 carbon atoms. Typical examples of such compounds are dimethyl disulfide, diethyl disulfide, di-n-propyl disulfide, diisopropyl disulfide, diamyl disulfide, dicyclohexyl disulfide, dioctyl disulfide, didecyl disulfide, ditetradecyl disulfide, dihexadecyl trisulfide and the like.

The ratio of sulfur to dimercaptan employed will vary appreciably but will generally be at least 2 moles of sulfur per mole of mercaptan. It is preferred to employ a mole ratio of sulfur to mercaptan in the range 2 to 5 moles of sulfur per mole of mercaptan.

The reaction between the dimercaptan and sulfur is ordinarily carried out at an elevated temperature. Generally speaking it is desirable to operate at a temperature high enough to maintain the sulfur in a molten condition. The actual temperatures employed will depend upon the mercaptan being reacted and the product desired. In general, however, the temperature will range from about 0 to about 500° F., preferably from about 150 to about 300° F.

The pressure at which the reaction is carried out will depend upon the mercaptan being reacted, the reaction diluent as well as other process variables. Generally speaking this pressure is sufficient to maintain the reactants substantially in the liquid phase. In general, however, the pressure will range from 0 to about 100 p.s.i.g., preferably from 0 to about 15 p.s.i.g. The reaction time will vary appreciably but ordinarily will range from about 0.25 to about 10 hours, preferably from about 1 to about 2 hours.

Catalysts suited for the purposes of this invention include those compounds having an alkaline reaction such as oxides and hydroxides of the metals, alkali metal sulfides, ammonia, amines, etc. but the amines are preferred for their solubility in the reaction mixtures. Representative examples of suitable amines that can be employed include mono-, di- and trialkyl amines having up to about 6 carbon atoms in each alkyl group, such as monoethanolamine, diethanolamine, triethanolamine, di-n-butyl amine, tri-n-butyl amine, dibenzyl amine, tetramethylene-pentamine, the guanidines such as diphenyl guanidine and the like. Another group of catalysts that can be employed include the alkali metal sulfides, especially sodium and potassium sulfides. These latter materials are preferably employed in the presence of a small amount of an alcohol such as methanol.

The amount of catalyst employed for carrying out the present invention can vary appreciably but will generally be in the range 0.5 to 5 weight percent of the reaction mixture, preferably from about 1 to about 2 weight percent of the reaction mixture.

The process of this invention is preferably carried out in the presence of an inert diluent. Diluents suitable for use in the process are hydrocarbons which are not detrimental to the oxidation reaction. Suitable diluents include aromatics such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, n-butane, n-pentane, isopentane, n-hexane, isohexane, 2,2,4-tri-methyl-pentane (isooctane), n-decane and the like. Mixtures of these paraffinic hydrocarbons can also be employed as diluents in carrying out the process of this invention. Cycloparaffins such as cyclohexane and methylcyclohexane can also be used. Also mixtures of any of the aforementioned hydrocarbons can be used as the diluent. The amount of diluent employed will vary appreciably and can range as high as 90 to 95 percent of the reaction mixture when desired.

Numerous variations in operative procedure can be employed. The dimercaptan compound or mixtures thereof are contacted with free sulfur or a sulfur-yielding compound in the presence of a basic catalyst under suitable reaction conditions as set forth above. The reaction of this invention can be carried out in a manner like that of the prior art and can be effected in a batch, intermittent or continuous manner.

The properties of the polymeric products obtained according to the invention will vary appreciably. The amount of sulfur present in the polymeric product of the invention will generally range from about 30 to about 60 weight percent. The polymers produced in accordance with this invention can be compounded by any of the known methods such as have been used in the past for compounding polysulfide polymers. Vulcanization accelerators, reinforcing agents and fillers such as have been normally employed in polysulfide rubbers can likewise be used in the compounds of this invention.

The polymers obtained by the invention have utility in applications where both natural and synthetic rubbers are used. For example, they can be used in the manufacture of automobile tires, gaskets and other rubber articles. The polymer compositions of the invention prior to curing can be applied to a base to coat same, and therefore can also be utilized as caulking compounds, linings for fuel tanks and the like.

The polysulfide polymers of the invention can be cured by curing agents such as zinc peroxide, hydrogen peroxide, p-quinone dioxime, lead peroxide, dibutylphthalate, stearic acid, zinc chromate, lead chromate, cumene hydroperoxide, benzoyl peroxide, lauroyl peroxide, naphthenates of metals such as copper, lead, zinc, etc., and mixtures or combinations of these curing agents. By the use of the proper curing agent, the polymer can be cured either at room temperature or with mild heat.

A better understanding of our invention will be obtained upon reference to the following illustrative examples which are not intended, however, to be unduly limitative of the invention.

*Specific example*

Two runs were carried out in which polysulfide polymers of 2,9-methane dithiol were prepared by reacting 2,9-p-menthane dithiol with 2 and 5 moles of sulfur per mole of dithiol at a temperature of about 80° F. The contacting was effected at approximately one atmosphere of pressure and in the presence of benzene as an inert diluent. The following recipe was employed for the 2 runs:

| Materials | 2 | | 5 | |
| --- | --- | --- | --- | --- |
| | G. | Moles | G. | Moles |
| 2,9-p-Menthane dithiol | 400 | 2 | 400 | 2 |
| Sulfur | 128 | 4 | 320 | 10 |
| Diphenyl guanidine | 2 | | 2 | |
| Benzene | 400 | | 600 | |

In the above runs the benzene diluent and 2,9-p-menthane dithiol were charged to a 2 liter reactor followed by the addition of the diphenyl guanidine catalyst. The mixture thus formed was heated to a temperature of approximately 130° F. and then sulfur was added to the reaction mixture slowly over a period of about 30 minutes so as to keep the reaction mixture from boiling over due to rapid evolution of $H_2S$. After evolution of $H_2S$ had stopped, the benzene solution of polymer was heated to a temperature of approximately 200° F. at about 20 mm. Hg absolute pressure to remove the last traces of benzene solvent.

Properties of the polymers obtained in the above two runs are as follows:

|  | 2 Moles Sulfur | 5 Moles Sulfur |
|---|---|---|
| Total Sulfur, wt. percent | 39.8 | 55.8 |
| Viscosity, poises at 200° F | 1,030 | 396 |
| Color, Gardner | 9 | 17 |

Both polymers obtained above are clear, resin-like solids at room temperature; however, they will cold flow over prolonged periods. Furthermore, both of the polymers are viscous oils at 200° F.

The above polymers are useful as additives for lube oil and rubber compounding, lacquers, plastics, grease additives and the like.

As will be evident to those skilled in the art, many variations and modifications of this invention can be practiced in view of the foregoing disclosure. Such variations and modifications are clearly believed to come within the spirit and scope of the invention.

We claim:

1. A process for the production of a polysulfide polymer which comprises contacting 2,9-p-menthane dithiol with free sulfur in the presence of a catalytic amount of a basic catalyst at a temperature in the range 0 to 500° F. to form said polymer, and recovering said polymer as a product of the process.

2. A process according to claim 1 wherein the mole ratio of sulfur of 2,9-p-menthane dithiol employed is in the range 2/1 to 5/1.

3. A process according to claim 1 wherein said catalyst is selected from the group consisting of alkyl amines and alkali metal sulfides.

4. A process for the production of a polysulfide polymer which comprises contacting 2,9-p-menthane dithiol with a material selected from the group consisting of free sulfur and sulfur-yielding compounds in a mole ratio of said sulfur material to dimercaptan in the range 2/1 to 5/1 in the presence of a catalytic amount of a basic catalyst at a temperature in the range 0 to 500° F., said contacting being effected in an inert hydrocarbon diluent, and recovering said polymer as a product of the process.

5. A process according to claim 4 wherein curing agents are incorporated into said recovered polymer and then said polymer is subjected to curing conditions.

6. The cured product of claim 5.

7. The process according to claim 4 wherein said catalyst is diphenyl guanidine.

8. A process for the production of a polysulfide polymer which comprises contacting 2,9-p-menthane dithiol with free sulfur in a mole ratio of sulfur to mercaptan in the range 2/1 to 5/1 in the presence of a basic catalyst at a temperature in the range 0 to 500° F., said contacting being effected in benzene as the reaction medium, and recovering said polymer as a product of the process.

References Cited by the Examiner

UNITED STATES PATENTS

| 2,076,875 | 4/1937 | Borglin et al. | 260—609 |
| 2,142,145 | 1/1939 | Patrick | 260—79.1 |
| 2,562,144 | 7/1951 | Harman et al. | 260—79.1 |
| 2,584,264 | 2/1952 | Foulks | 260—79.1 |
| 2,676,165 | 4/1954 | Fettes | 260—79 |
| 2,866,776 | 12/1958 | Nummy | 260—79.1 |
| 3,053,816 | 9/1962 | Stone | 260—79.1 |

OTHER REFERENCES

Reid: Organic Chemistry of Biovalent Sulfur, vol. I, pp. 121 and 122, 1958.

Gilman et al.: Organic Chemistry, vol. IV, page 596, 1953.

Marvel et al.: Journal of Polymer Science, vol. 26, October 1957, pp. 23–28.

JOSEPH L. SCHOFER, *Primary Examiner.*

JOSEPH LIBERMAN, *Examiner.*